(12) United States Patent
Hyers et al.

(10) Patent No.: US 11,591,703 B2
(45) Date of Patent: Feb. 28, 2023

(54) SYSTEMS AND METHODS FOR MOLTEN OXIDE ELECTROLYSIS

(71) Applicant: Boston Electrometallurgical Corporation, Woburn, MA (US)

(72) Inventors: Robert Hyers, Woburn, MA (US); Guillaume Lambotte, Woburn, MA (US); Matthew Humbert, Woburn, MA (US); Richard Bradshaw, Woburn, MA (US)

(73) Assignee: Boston Electrometallurgical Corporation, Woburn, MA (US)

( * ) Notice: Subject to any disclaimer, the term of this patent is extended or adjusted under 35 U.S.C. 154(b) by 0 days.

(21) Appl. No.: 16/648,134

(22) PCT Filed: Sep. 17, 2018

(86) PCT No.: PCT/US2018/051323
§ 371 (c)(1),
(2) Date: Mar. 17, 2020

(87) PCT Pub. No.: WO2019/055910
PCT Pub. Date: Mar. 21, 2019

(65) Prior Publication Data
US 2020/0263313 A1 Aug. 20, 2020

Related U.S. Application Data

(60) Provisional application No. 62/559,860, filed on Sep. 18, 2017.

(51) Int. Cl.
*C25B 9/00* (2021.01)
*C25B 11/00* (2021.01)
(Continued)

(52) U.S. Cl.
CPC .............. *C25C 3/08* (2013.01); *C25C 3/16* (2013.01); *C25C 7/005* (2013.01); *C25C 7/025* (2013.01); *C25C 7/06* (2013.01)

(58) Field of Classification Search
CPC .. C25B 9/00; C25B 9/63; C25B 11/00; C25B 9/05; C25C 3/08; C25C 7/005;
(Continued)

(56) References Cited

U.S. PATENT DOCUMENTS 1,505,495 A 8/1924 Rodrian
3,769,195 A 10/1973 Weterings
(Continued)

FOREIGN PATENT DOCUMENTS

CN 106541481 A 3/2017
CN 106811563 A 6/2017
(Continued)

OTHER PUBLICATIONS

Russian Application No. RU202113884 received an Office Action dated Oct. 14, 2020, 15 pages, 6 pages English Translation, 9 pages Original Document.
(Continued)

*Primary Examiner* — Zulmariam Mendez
(74) *Attorney, Agent, or Firm* — Kilpatrick Townsend & Stockton LLP

(57) ABSTRACT

Metallurgical assemblies and systems according to the present technology may include a refractory vessel including sides and a base. The base may define a plurality of apertures centrally located within the base. The sides and the base may at least partially define an interior volume of the refractory vessel. The assemblies may include a lid removably coupled with the refractory vessel and configured to form a seal with the refractory vessel. The lid may define a plurality of apertures through the lid. The assemblies may also include
(Continued)

a current collector proximate the base of the refractory vessel. The current collector may include conductive extensions positioned within the plurality of apertures centrally located within the base.

19 Claims, 6 Drawing Sheets

(51) Int. Cl.
*C25C 3/08* (2006.01)
*C25C 3/16* (2006.01)
*C25C 7/00* (2006.01)
*C25C 7/02* (2006.01)
*C25C 7/06* (2006.01)

(58) Field of Classification Search
CPC .... C25C 3/20; C25C 7/06; C25C 3/00; C25C 3/16; C25C 7/00; C25C 7/04; C25C 7/02
See application file for complete search history.

(56) References Cited

U.S. PATENT DOCUMENTS

| | | | |
|---|---|---|---|
| 3,888,757 A | 6/1975 | Roukema et al. | |
| 4,032,020 A | 6/1977 | Kato et al. | |
| 4,053,384 A | 10/1977 | Siegmund | |
| 4,221,641 A | 9/1980 | Weber et al. | |
| 4,222,841 A | 9/1980 | Miller | |
| 4,400,815 A | 8/1983 | Dunn et al. | |
| 4,855,031 A | 8/1989 | Zannini | |
| 5,567,286 A | 10/1996 | Pal et al. | |
| 6,358,393 B1 | 3/2002 | Berclaz et al. | |
| 7,422,675 B2 | 9/2008 | Acker et al. | |
| 2004/0011660 A1 | 1/2004 | Bradford et al. | |
| 2004/0112757 A1 | 6/2004 | Siljan et al. | |
| 2013/0181468 A1* | 7/2013 | David | B66C 1/42 294/197 |
| 2016/0108532 A1 | 4/2016 | Powell et al. | |

FOREIGN PATENT DOCUMENTS

| | | |
|---|---|---|
| CN | 109355679 A | 2/2019 |
| CN | 210529079 U | 5/2020 |
| CN | 212570163 U | 2/2021 |
| GB | 1287065 A | 8/1972 |
| IT | 1207400 B | 5/1989 |
| NL | 198003351 A | 1/1982 |
| RU | 2201475 C2 | 3/2003 |
| RU | 2245944 C1 | 2/2005 |
| TW | I480378 B | 4/2015 |
| WO | 2005/052217 A1 | 6/2005 |
| WO | 2018/031984 A1 | 2/2018 |

OTHER PUBLICATIONS

PCT/US2018/051323 filed Sep. 17, 2018, received an International Search Report and Written Opinion dated Nov. 20, 2018, 7 pages.
*Ore-Smelting Furnaces*, Stronsky Metallurgical Industry Press, pp. 256-258, May 31, 1980.
Ying, et al., *Industrial Material and Forming Technology Basis*, Beijing Institute of Technology Press, pp. 177-178, Jul. 31, 2009.
European Application No. EP18856397.7 received an Extended European Search Report dated May 25, 2021, 10 pages.
"Research and Innovation of Metallurgical Engineering Design (Metallurgical and Material Engineering)", Beijing Shougang International Engineering Technology Co., Ltd. Metallurgical Industry Press, Feb. 28, 2013, p. 42, no English translation available.
Japan Application No. JP2020-515924 received a Notice of Allowance, dated May 17, 2022, 3 pages, no English translation available.
Taiwan Application No. TW107132732 received an Office Action, dated May 13, 2022, 6 pages, no English translation available.

* cited by examiner

SYSTEMS AND METHODS FOR MOLTEN OXIDE ELECTROLYSIS

TECHNICAL FIELD

The present technology relates to systems and components in which electrolytic processing may be performed, and methods of utilizing those systems. More specifically, the present technology relates to processing systems for performing molten oxide electrolysis or other metallurgical operations.

BACKGROUND

Metallurgical vessels and systems are used for a variety of processes including metal smelting and refining operations that may include smelting and molten oxide electrolysis, for example. The vessels and systems to conduct such processes are often designed around a particular process principle, metal product, and metal feedstock, and may not be used for multiple metals or processing operations. Additionally, operation of the systems may be limited based on the materials used and on the fixed dimensions and operational characteristics of the system. Many metallurgical operations are limited to particular temperature or energy sources, and thus may be unsuitable for processing or refinement of many different useful metals and materials. Finally operation of these systems may be inefficient due to constant operational stoppages to perform tapping or feed the raw materials, electrode replacement operations, or fluctuating temperature and or productivity Thus, there is a need for improved vessels and systems that may be used to process a range of metals and materials in an efficient manner. These and other needs are addressed by the present technology.

SUMMARY

Metallurgical assemblies and systems according to the present technology may include a refractory vessel including sides and a base. The base may define a plurality of apertures centrally located within the base. The sides and the base may at least partially define an interior volume of the refractory vessel. The assemblies may include a lid, such as a refractory lid, removably coupled with the refractory vessel and configured to form a seal with the refractory vessel. The lid may define a plurality of apertures through the lid. The assemblies may also include a current collector proximate the base of the refractory vessel. The current collector may include conductive extensions positioned within the plurality of apertures centrally located within the base.

In embodiments, the metallurgical assembly may include a gas seal coupled about a first aperture of the plurality of apertures defined through the lid. The gas seal may be configured to receive and pass a movable anode through the gas seal and first aperture defined through the lid. The gas seal may be configured to limit gas release from the refractory vessel through the first aperture of the plurality of apertures defined through the lid. The plurality of apertures defined through the lid may include an exhaust aperture sized to distribute gas from the refractory vessel, and a feed aperture sized to distribute material into the refractory vessel. The refractory vessel may include a powder layer at least partially defining sidewalls of the refractory vessel. The refractory vessel may also include a compatibility layer defining the base of the refractory vessel. The compatibility layer also may at least partially define the sidewalls of the refractory vessel.

The refractory vessel may include at least two layers of material. An exterior layer may include an insulating material. An interior layer may include a material configured to be chemically compatible with an electrolyte contained within the interior volume of the refractory vessel. The refractory vessel may further include an intermediate layer of material positioned to define at least a portion of the interior volume of the refractory vessel. The interior layer may be characterized by a thermal conductivity below or about 25 W/(m·K). The insulating layer may be characterized by a thermal conductivity below or about 5 W/(m·K).

The present technology also encompasses metallurgical systems. The systems may include a refractory vessel. The systems may include a lid removably coupled with the refractory vessel and configured to form a seal with the refractory vessel. The lid may define a plurality of apertures through the lid. The systems may also include an electrode support assembly. The electrode support assembly may include a vertically translatable holder. The vertically translatable holder may be configured to couple with an electrode and electrically couple the electrode with a power source.

The metallurgical system may also include a system base including a platform on which the refractory vessel may be supported. The system may also include a current collector positioned between the platform and the system base. The current collector may be mechanically coupled with the refractory vessel. The electrode support assembly may also include a mast, which may include a vertical track. The electrode support assembly may also include a trolley moveably coupled with the track. The electrode support assembly may also include a truss coupling the vertically translatable holder with the trolley. The truss may be or include a curved truss extending from a first end at the trolley to a second end at which the vertically translatable holder may be coupled. The second end of the curved truss may position the vertically translatable holder in axial alignment about a vertical axis with an aperture of the lid. The system may also include a first power source electrically coupled with the electrode by the vertically translatable holder. The system may also include a second power source electrically coupled with the trolley. The electrode may be an anode in embodiments. A first end of the anode may extend within an internal volume defined by the refractory vessel through the gas seal. A distal portion of the anode may be coupled with the vertically translatable holder.

The present technology may also encompass additional metallurgical systems. The systems may include a refractory vessel. The systems may also include a lid removably coupled with the refractory vessel and configured to form a seal with the refractory vessel. The lid may define a plurality of apertures through the lid. A first aperture of the plurality of apertures may include an exhaust port. The systems may include an electrode support assembly. The systems may also include an exhaust system coupled with the exhaust port of the lid. The exhaust system may be configured to oxidize effluents received from the refractory vessel. A second aperture of the plurality of apertures defined through the lid may include a feed port. The metallurgical system may also include a feed system coupled with the feed port. The feed system may be configured to provide material into the refractory vessel.

Such technology may provide numerous benefits over conventional techniques. For example, the technology may produce metallurgical systems and assemblies that may be operated along a wider spectrum of temperature and energy than conventional systems. Additionally, the present technology may be used in continuous processes as opposed to less efficient batch processing. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
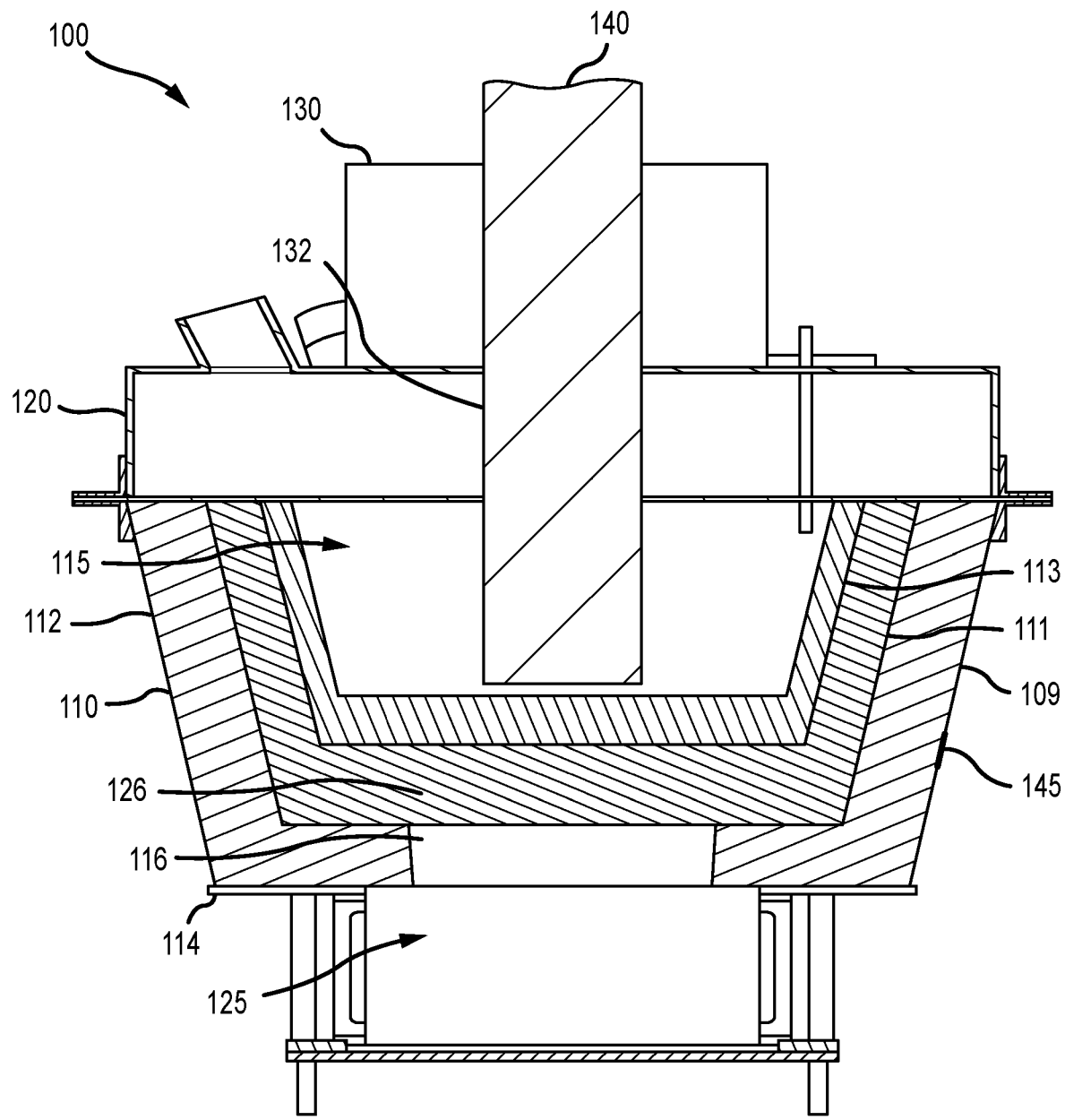
FIG. 1 illustrates a schematic cross-sectional view of an exemplary metallurgical assembly according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

In metallurgical processing, high heat from thermal or electrical sources, for example, may be used to process a variety of materials including metals and metal-containing materials. These materials may have melting points well over 1,000° C., and thus the vessel and any associated components in contact with the molten materials may conduct extraordinarily high temperatures. Many systems operate with a frozen crust of electrolyte, which may protect walls of the cell from the highest temperatures as well as from chemical attack of the interior walls from electrolytic components.

Conventional cells may be limited by the set-up of the vessel or overall system. For example, many designs require a full stoppage to extract solidified product. Additionally, consumption of one of the electrodes, such as the anode, may halt operation, as well as complete reduction of the target substance within the system, which may require additional batches to be performed. Conventional systems may have dealt with these issues by generally accepting the limitations or inefficiencies of the system itself. The present technology, on the other hand, utilizes system configurations and operational principles that allow continuous operation of a cell to produce a variety of target materials.

Turning to FIG. 1A is illustrated a cross-sectional view of an exemplary metallurgical assembly 100 according to embodiments of the present technology. The assembly and its constituent components may be used to generate heat in any number of manners to melt materials housed within. The heat may be produced by high temperature applications to the vessel, and may also be developed or generated by electrical energy. The assembly 100 may include a refractory vessel 110 including sides 112 and base 114. The sides 112 and base 114 may at least partially define an interior volume 115 within refractory vessel 110. Refractory vessel 110 may be configured to house one or more materials for processing, such as metal-containing materials, including metal oxides. The vessel may be used in any number of processing configurations, including molten oxide electrolysis, and may include electrolyte materials in addition to a metal-containing material being processed. Refractory vessel 110 may define at least one, and may define a plurality, of apertures 116 in a central region of base 114. The apertures may provide access for conductive members associated with a current collector as discussed below.

Metallurgical assembly 100 may also include a lid 120 utilized in conjunction with refractory vessel 110. Lid 120 may be removably coupled with the refractory vessel 110, and may be directly coupled, bolted, fastened, or bonded with refractory vessel 110. In embodiments, lid 120 may be removably coupled with refractory vessel 110 with bolts, fasteners, or other materials configured to couple two structures. The lid 120 and vessel 110 may each have a flange providing a surface of contact for coupling the two components. In operation, lid 120 may be coupled with refractory vessel 110 in order to form a seal, which may be a liquid seal, or may be a hermetic seal. Additionally, in some embodiments, lid 120 may be coupled with refractory vessel 110 to facilitate containment and/or collection or removal of produced effluent materials including gas byproducts. In some embodiments, lid 120 may be configured to form a partially, substantially, or completely hermetic seal with refractory vessel 110. Lid 120 may define a plurality of apertures through the lid 120 structure, as discussed in more detail below with FIG. 2.

Metallurgical assembly 100 may also include a current collector 125 positioned proximate the base 114 of refractory vessel 110. Current collector 125 may be a conductive bar or material coupled with or within the refractory vessel 110. In some embodiments, current collector 125 may include conductive extensions 126 positioned within the plurality of apertures 116 centrally located within the base 114 of refractory vessel 110.

Metallurgical assembly 100 may include a gas seal 130 coupled about a first aperture 132 defined through lid 120. The gas seal 130 may be configured to receive and pass a moveable anode 140 through the gas seal 130 and first aperture 132 defined through the lid 120. Depending on the process being performed within refractory vessel 110, the anode may be moved in one or more ways. For example, anode 140 may be formed from carbon or some other conductive material in embodiments. The process itself may at least partially consume carbon in an oxidation reaction, for example, which may produce carbon monoxide, carbon dioxide, or some other carbon-containing material. During a process in which the carbon is consumed, the anode may be repositioned, such as by being lowered further into the refractory vessel 110, in order to maintain contact with the electrolyte material, maintain a particular distance between the anode and the system cathode, or provide additional material for consumption. Additionally, during tapping operations, the level of material within the refractory vessel 110 may lower, and the anode may be lowered as well to maintain a reaction during tapping. Other scenarios may similarly be encompassed in which the anode 140 is translated during operation. Although illustrated as including a single anode, various embodiments may include multiple anodes and anode holding systems depending on the size and shape of the vessel and distribution of cathode materials or current collectors.

Gas seal 130 may be included to allow vertical translation of the anode 140, while maintaining or substantially maintaining a hermetic seal. For example, first aperture 132 through lid 120 may be sized to accommodate multiple sizes of anodes 140, or may include a tolerance to allow movement of anode 140 during operation. A gap that may exist about anode 140 within first aperture 132 may provide a path of egress for gas formed during operations. The produced gas may include constituents that may be harmful if released untreated, or may represent heat loss from the system, reducing efficiency of the process performed. Accordingly, gas seal 130 may be formed or configured to limit gas release from the refractory vessel 110 through the first aperture 132 defined through lid 120. Gas seal 130 may include multiple plates bolted or bonded together, and may include one or more gaskets to form a vapor barrier about anode 140.

The refractory vessel 110 may include a number of layers and materials in embodiments of the technology. Although FIG. 1 illustrates a three-layer refractory vessel, it is to be understood that refractory vessels according to the present technology may include 1, 2, 3, 4, 5, or more layers in a variety of configurations in embodiments. As illustrated, refractory vessel 110 includes multiple layers, and may include at least two layers of material in embodiments. Refractory vessel 110 may include an exterior layer of material 109, which may be an insulating material configured to reduce heat loss from the refractory vessel. Refractory vessel 110 may also include an interior layer of material 113, which may be contacted by one or more materials within refractory vessel 110 including electrolyte components. The interior layer of material 113 may include a material configured to be chemically compatible with an electrolyte contained within the interior volume 115 of the refractory vessel 110. This material may be a material particular to a chemical process being performed within refractory vessel 110. For example, material 113 may be a material chemically inert to one or more components of an electrolyte, or the material may be composed of materials capable of withstanding temperature, pressure, and/or chemical conditions within the interior volume 115 of refractory vessel 110.

Refractory vessel 110 may also include an intermediate layer of material 111 in some embodiments. The intermediate layer of material 111 may provide stability to the refractory vessel in terms of structure, temperature, reactivity, or other characteristics. Each of the layers of material may be included in various forms. For example, each layer of material may form part of one or both of sides 112 as well as base 114. As illustrated in FIG. 1, interior layer of material 113 may form interior sidewalls of refractory vessel 110, while intermediate layer of material 111 may form the interior base, and may define apertures through base 114 of refractory vessel 110, as well as may exterior layer 109. A cooling jacket (not shown) may be positioned about refractory vessel 110, and may flow one or more cooling fluids about the refractory vessel. The cooling jacket may additionally include a reflective surface to reduce radiative heat from refractory vessel 110. Other configurations are possible in which materials form one or more regions of refractory vessel 110.

The refractory vessel 110 may be designed from a number of materials in typical furnace production including fire clays, and various non-metal materials including oxides of various elements. By way of example, the vessel may be composed of metals or ceramics, and may include oxides, carbides, and/or nitrides of silicon, calcium, magnesium, aluminum, and boron. Refractory vessel materials may also include one or more of iron, steel, niobium, molybdenum, tantalum, tungsten, rhenium, titanium, vanadium, chromium, zirconium, hafnium, ruthenium, rhodium, osmium, or iridium, as well as oxides, nitrides, and other combinations including one or more of these materials. Additional materials may be used where the material or materials are capable of withstanding temperatures above or about 500° C., above or about 1,000° C., above or about 1,500° C., above or about 2,000° C., above or about 2,500° C., above or about 3,000° C., above or about 3,500° C., above or about 4,000° C., or higher. Unlike many conventional vessels, such as many Hall Heroult vessels that may be limited to temperatures below or about 1,000° C., the present vessels may be capable of operating at much higher temperatures, facilitating electrochemical processing of many additional metals having melting points above 1,500° C. Additionally, the materials may not react with materials contained within the vessel. Refractory vessel 110 may also include a port 145 configured to deliver refined or worked materials from the refractory vessel 110. It will be readily appreciated by those of skill that ports may be positioned in any number of locations, and should not be considered limited to the exemplary design illustrated.

The refractory vessel materials may also be formed or include materials characterized by particular thermal characteristics. For example, interior layer of material 113 may be characterized by a higher thermal conductivity than exterior layer of material 109, which may be an insulating layer. Any of the refractory vessel materials may be characterized by a thermal conductivity below or about 30 W/(m·K), and may be characterized by a thermal conductivity below or about 25 W/(m·K), below or about 20 W/(m·K), below or about 15 W/(m·K), below or about 10 W/(m·K), below or about 5 W/(m·K), below or about 3 W/(m·K), below or about 2 W/(m·K), below or about 1 W/(m·K), below or about 0.5 W/(m·K), or less. The thermal conductivity of each layer may also be any smaller range within any of these stated ranges, such as between about 0.5 W/(m·K) and about 2 W/(m·K) or a smaller range within this or other noted ranges.

Figure 2:
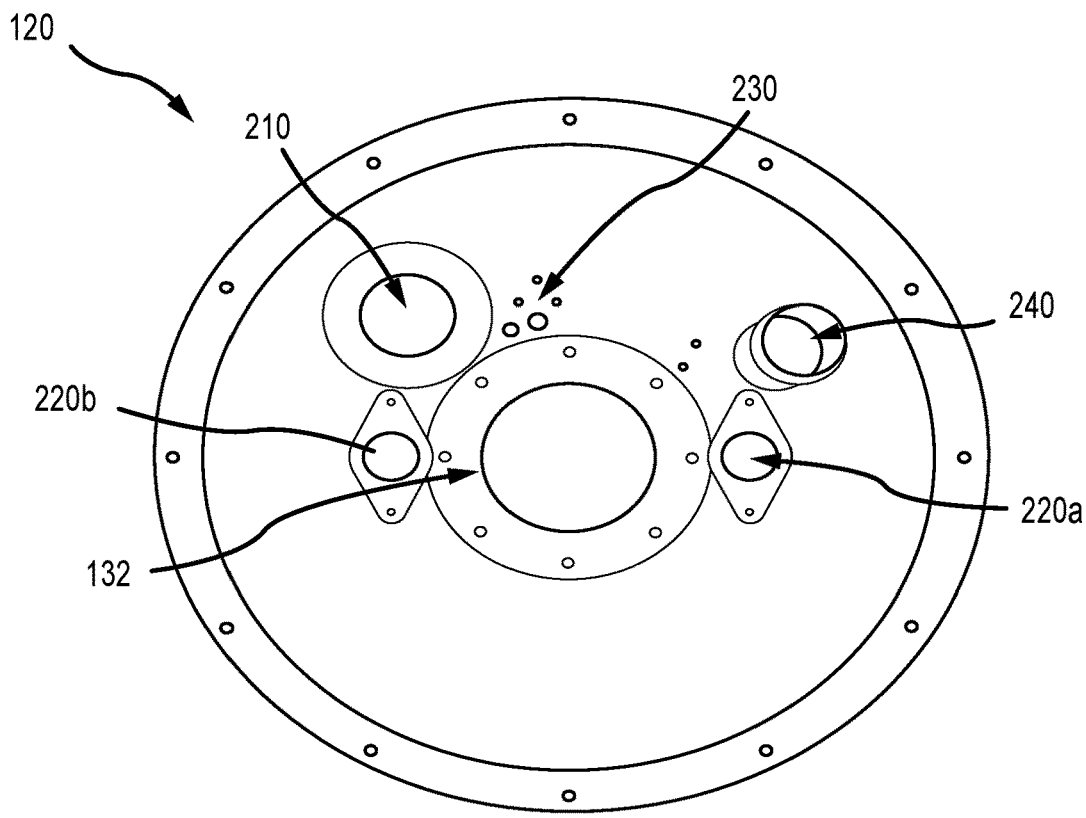
FIG. 2 illustrates a schematic top view of an exemplary metallurgical vessel lid according to embodiments of the present technology.

Turning to FIG. 2 is shown a schematic top view of an exemplary metallurgical vessel lid 120 according to embodiments of the present technology. As previously noted, lid 120 may define a plurality of apertures through the structure. A central aperture, which may be first aperture 132, may be provided for accommodating an anode as previously described. Lid 120 may form a landing or flange about first aperture 132 to accommodate and provide a stable or flat surface for a gas seal to limit or prevent fluid egress about an anode or electrode positioned through first aperture 132. Lid 120 may also define an exhaust aperture 210, which may be sized to distribute gas from a refractory vessel. Exhaust aperture 210 may also include a landing or flange to couple piping or other equipment that may allow a fluid seal about exhaust aperture 210. An exhaust aperture may allow control of the pressure within the metallurgical system, and may also allow recovery of formed vapor for a number of purposes. For example, recovered vapor may be cleaned, scrubbed, or further processed to reduce harmful or unwanted properties. Additionally, recovered vapor may be utilized as a heat source for other operations, and vapor may be recovered for other uses. For example, certain processing operations of metal oxides may produce oxygen gas at the anode, which may be collected from the system and used for various purposes for which oxygen is useful.

Lid 120 may also define one or more feed apertures 220, which may be sized to distribute material or materials into the refractory vessel. As illustrated, the feed apertures 220 may be defined through lid 120 relative to exhaust aperture 210. For example, depending on the systems associated with exhaust recovery or processing, as well as material feeding, a feed aperture 220a may be formed distal to an exhaust aperture 210 as illustrated. Lid 120 may also define multiple feed apertures through the lid, which may be used for providing multiple positions of feeding a similar material, or may provide access for feeding different materials into a refractory vessel. For example, as illustrated, lid 120 includes two feed apertures 220, although a greater or lesser number of feed apertures may be included. While feed aperture 220a may be used to provide an oxide of a target metal, for example, feed aperture 220b may be utilized for providing additional electrolyte materials, alloy materials, or other additives or components into a refractory vessel. Additionally, feed apertures 220a may be designed to facilitate delivery of fine particulate material, such as via a sieve or funneled opening. Many conventional systems involve turbulent operation that may cause sintering or agglomeration of delivered material. The present technology may provide much more stable operation, allowing fine particle materials to be delivered to the system.

An advantage of the systems described in the present technology is that they may facilitate continuous materials processing, unlike electric arc furnaces. The present systems may continuously consume electricity to generate heat and produce end materials. Many conventional high-temperature reactors may only operate in batch processing. Although some Hall Heroult systems may operate with continuous electrical consumption, these systems operate at far reduced temperatures, reducing the heat generation and radiation. From these advantages, including one feed port that may receive a controlled stream of an oxide of a target metal may facilitate continuous processing. The feed apertures 220 may also include a landing or flange for coupling piping or other components associated with delivery of material, which may allow a seal to be formed about the feed apertures. Because the associated feed equipment may be coupled with the lid 120, either directly or indirectly, removal of the equipment to add other components may be difficult or inefficient. Accordingly, for multi-component systems or for coordinating electrolyte materials, multiple feed apertures 220 may be defined through lid 120.

Lid 120 may also define apertures 230, which may include injection apertures as well as sensing apertures. Some operations may benefit from injection of gas during the operation. Gas feed apertures may allow incorporation of various elements into the refractory vessel. Gas feed apertures included in apertures 230 may include a nozzle or port to which gas lines may be coupled, or may include inlets into which gas piping may be inserted. Apertures 230 may also include apertures for sensing equipment including temperature, pressure, electrical, and other sensing operations. The sensors and equipment utilized may be specifically configured to operate at temperatures up to, above, or about 1,000° C., about or about 2,000° C., above or about 3,000° C. or higher. However, many standard sensors may be utilized from the unique operating perspective of the present technology. The described systems may produce a localized heat effect within the vessel, which may provide various locations about the vessel having temperatures that may be several hundred degrees below a central portion of the vessel. This may allow incorporation of sensors and other equipment that could not historically be included in some conventional systems, such as electric arc furnaces, due to the radiative transfer of heat at temperatures that may exceed 2,000° C. Similar to other apertures defined in lid 120, apertures 230 may provide a seal to limit or prevent gas loss or sputtering from the refractory vessel.

Lid 120 may also include access ports 240, which may extend from lid 120 in various directions, locations, or at various angles. Access ports may include threaded regions or other gasket or flange connections, which may allow the access ports to be sealed with a cap or other closure during operation to limit or prevent gas release. The access ports may facilitate visual inspection, testing, or other operations by providing various access to regions of the refractory vessel. The access ports 240 may be distributed about lid 120 as illustrated to provide access to different regions of the refractory vessel during operation. Lid 120 may include any number of each aperture type through the lid, and the illustrated configuration is merely a single possible configuration encompassed by the present technology. It is to be understood that other configurations, aperture numbers, and aperture combinations are similarly encompassed by the present technology.

Figure 3:
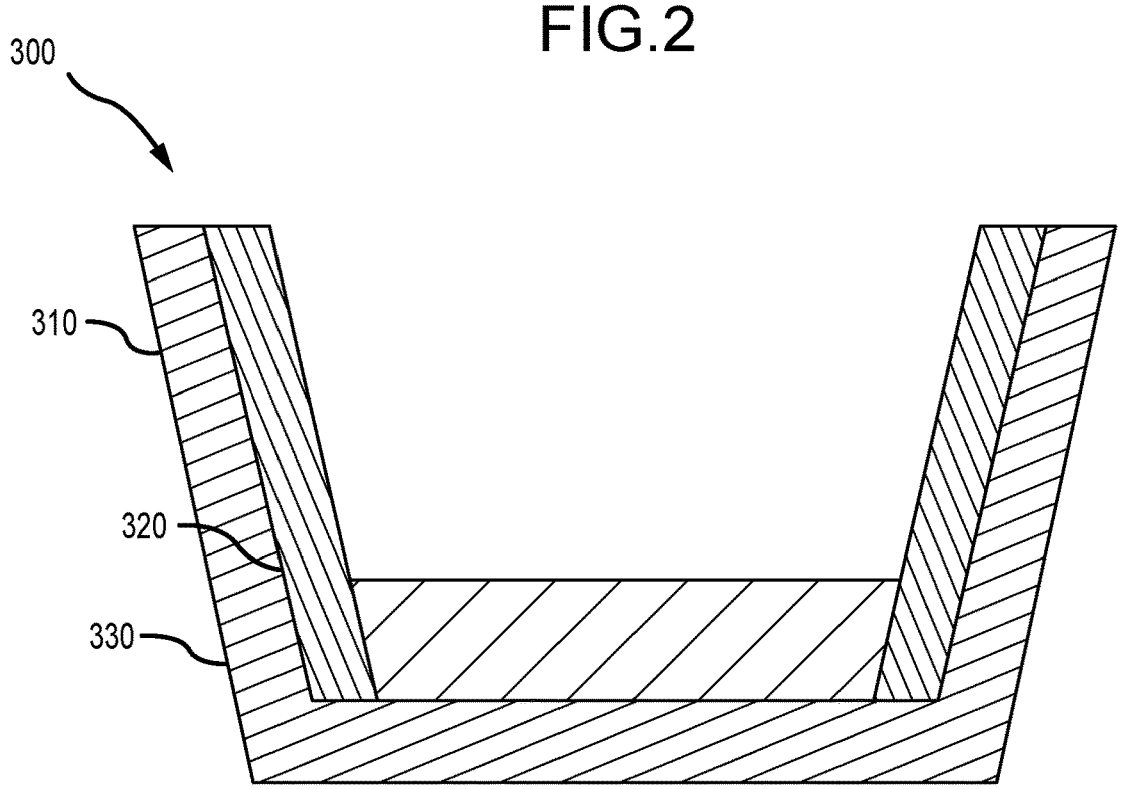
FIG. 3 illustrates a schematic cross-sectional view of a metallurgical vessel according to embodiments of the present technology.

FIG. 3 illustrates an additional schematic cross-sectional view of a refractory vessel 300 according to embodiments of the present technology. Refractory vessel 300 may include an additional configuration of materials, which may include a powder layer 310. Powder layer 310 may be or include any of the previously described materials, and may become structurally hardened at operating temperatures, which may rise above 1,000° C. The powder layer 310 may at least partially define sidewalls of the refractory vessel 300. The refractory vessel 300 may also include a compatibility layer 320. Compatibility layer 320 may define the interior base of the refractory vessel 300, and may define the apertures through which conductive members of the current collector may be distributed. As illustrated, compatibility layer 320 may also at least partially define sidewalls of the refractory vessel along with powder layer 310. Compatibility layer 320 may be configured to be chemically, thermally, or otherwise compatible with materials included within the refractory vessel. Refractory vessel 300 may also include an insulation material 330 included in an exterior region about the refractory vessel 300.

Characteristics of the refractory vessel 300 may be in part based on the materials used in the formation of the vessel. For example, aluminum oxide, magnesium oxide, zirconium oxide, or other materials may contribute to the characteristics of the refractory vessel. For example, resistivity of the refractory may range from greater than or about $1.0E24\ \Omega\cdot m$ at temperatures below about 500° C. to less than or about 1.0E9 Ω·m at temperatures above 1,000° C., and may include any value in this range. Additionally, the ionic conductivity percentage at temperatures above 500° C. may vary depending on the materials. When materials with lower ionic transference are used the ionic conductivity may be down to zero percent, while incorporation of materials with higher ionic transference are used the conductivity may be up to 100 percent, and may include any value in this range.

The refractory vessel may be characterized by a thermal expansion coefficient also based on the materials used in the vessel. For example, a thermal expansion coefficient of the refractory may be between about 2 μm/m·° C. to about 18 μm/m·° C. or more, and may include any value in this range. The value may adjust based on operating temperatures, and may be characterized by a temperature-based change from about −1 to about +1 with varying materials and operating temperatures. The refractory vessel may also be characterized by a porosity based in part on the materials and formation of the vessel. In embodiments, the refractory may be characterized by a porosity of less than or about 10% up to greater than or about 80%, and may include any specific porosity within this range. Porosity may increase the insulating ability of the refractory, and in some embodiments the porosity may be greater than or about 50%.

Figure 4:
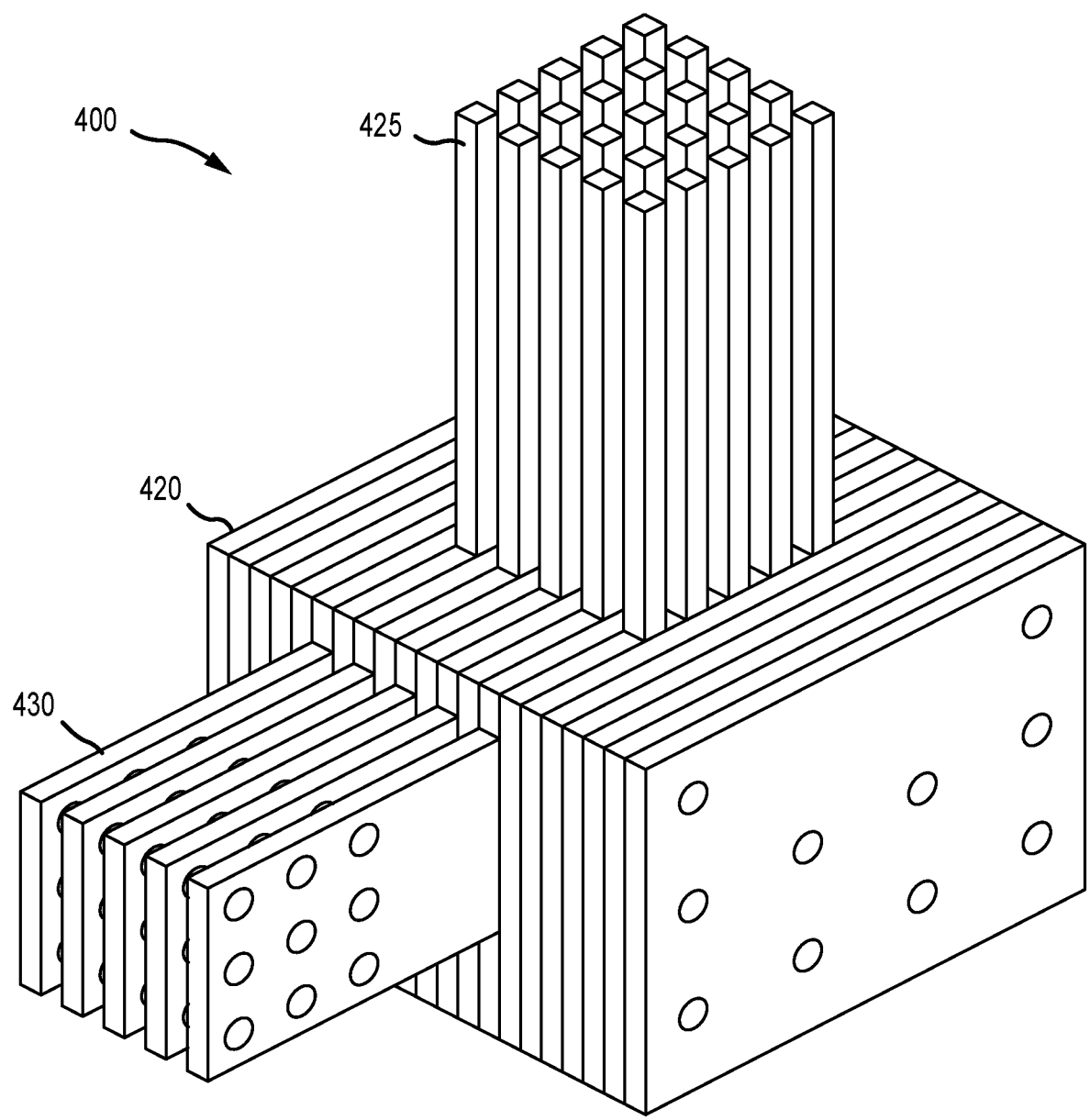
FIG. 4 illustrates a schematic perspective view of a current collector according to embodiments of the present technology.

Turning to FIG. 4 is illustrated a schematic perspective view of a current collector 400 according to embodiments of the present technology. As illustrated, the current collector 400 may include a block 420, which may include one or more bus bars 430 to provide electrical communication from the metallurgical assembly. The current collector 400 may also include a plurality of conductive extensions 425 protruding from the block 420. The conductive extensions 425 may be included in a pattern as illustrated, but the number and pattern may be predetermined for a particular metallurgical vessel.

The number and position of conductive extensions 425 may affect the heat flow and heat power through the vessel, and thus by adjusting the number and position of the conductive elements, the system may be adjusted in a number of ways to develop stability or equilibrium within the vessel. Accordingly, for exemplary metallurgical assemblies and vessels of the present technology, the conductive elements may be positioned along the current collector block 420 according to a pattern configured to provide thermal and fluidic equilibrium throughout the refractory vessel during operation. The pattern may take a variety of geometries based on the size and shape of the vessel, and the number and spacing of the conductive extensions may also be modified similarly.

In some embodiments, the current collector and/or the anode may not be electrically connected with the vessel. The components may also be electrically isolated from the lid. The vessel may be allowed to electrically float, which may limit or prevent electrical grounding of the electrochemical cell. In this way, during operational events in which stray current shorts from internal contents to the vessel or lid, there is not necessarily a short to ground.

By affecting the heat and power flow through the cell, the conductive extensions may also be utilized to control the shape and location of a metal-containing material located within the metallurgical assembly. For example, industrial electrolysis cells may utilize or form a pad of the metal being refined in order to produce stratified layers of material through the refractory vessel, with the more dense, refined metal along the base of the refractory vessel. However, this pad may be relatively thick in order to maintain a flat profile within the refractory. The configuration of the conductive extensions may affect the current through the system, which may be configured to cause the melting pad to lay flat within the refractory.

In many configurations of the present technology, molten metal formed along the base of the refractory vessel may operate as the cathode in the operation. The conductive extensions or pins 425 may be included based on their conductive qualities, and may include a metal in embodiments. For example, the conductive extensions 425 may be or include silver, copper, gold, aluminum, zinc, nickel, brass, bronze, iron, platinum, a carbon-containing material, lead, or steel in embodiments. In one embodiment the conductive extensions 425 may include copper, which has a melting point of below 1,100° C. However, if the metal being refined is, for example, iron, the liquid iron may be at a temperature of over 1,500° C. Accordingly, the molten metal may melt conductive extensions 425 to produce a molten mixture of the conductive elements and the metal being refined.

The conductive extensions may be a metal having a melting point lower than the melting temperature of the material being refined within the vessel. In such an instance, the portion of the conductive extensions 425 in contact with the material within the vessel may also melt. Because of the relatively stable temperature beyond the melting point of the material within the vessel, the heat may be transmitted to an extent through the refractory base 114 and the conductive extensions 425. This may cause at least a portion of the conductive extensions 425 to melt. This liquid material, which may include a mixture of the material being refined as well, may fill in any interstitial space between the conductive extensions and the aperture before being re-solidified within the pin bore or apertures 116 previously described as the metal moves further from the thermal center. In operation, this may protect against egress of molten material through the aperture to the collector, which may cause a system failure if not regulated. Accordingly, the materials may be capable of self-healing within the structure. In embodiments, additional cooling may also be provided to the conductive elements, such as via a fluid transfer to air, water, or some other fluid that may transfer heat from the conductive elements.

The apertures may each be characterized by a volume configured to accommodate within each of the plurality of apertures at least a portion of each of the conductive elements in a melted state. This may include a melted mixture of the conductive extensions and the material being refined. In embodiments, the length of the conductive extensions may be maintained at or below a level equal to the thickness of the refractory base 114. In so doing, the material within the refractory may be maintained in a substantially purer state, and when this material is removed, or tapped, it is less likely to pull material from the conductive elements as well.

Figure 5:
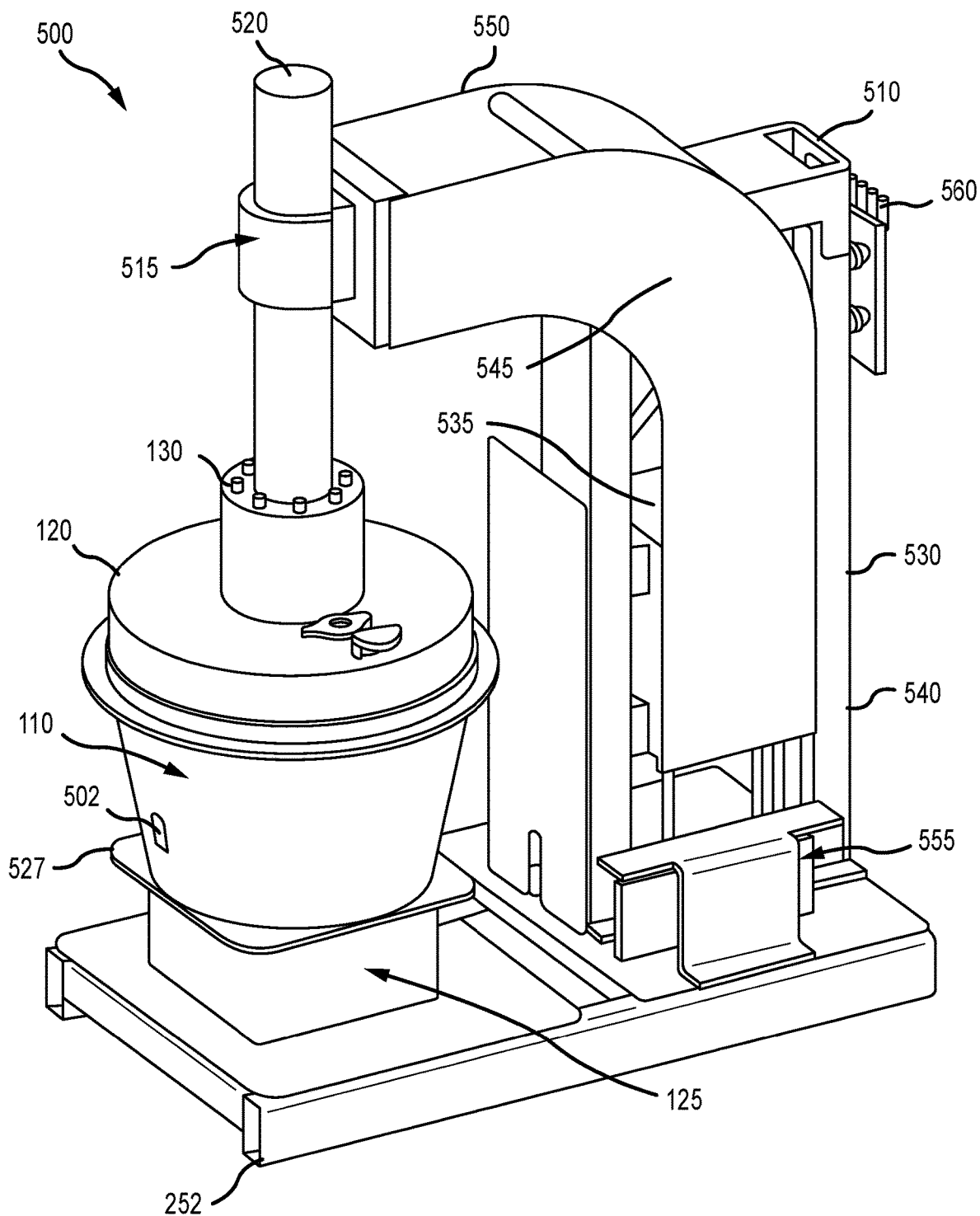
FIG. 5 illustrates a schematic perspective view of an exemplary metallurgical system according to embodiments of the present technology.

FIG. 5 illustrates a schematic perspective view of an exemplary metallurgical system 500 according to embodiments of the present technology. Metallurgical system 500 may include some or all of the components of metallurgical assembly 100 as previously described. For example, metallurgical system 500 may include refractory vessel 110. Refractory vessel 110 may include a port 502 to provide access for tapping refractory vessel 110. Port 502 may include a lip or connector for coupling a channel for delivering refined material from the refractory vessel 110 in embodiments. Metallurgical system 500 may also include a lid 120, which may be configured to form a substantially hermetic seal with refractory vessel 110 as previously described. Lid 120 may also define a plurality of apertures as discussed above with regard to FIG. 2.

Metallurgical system 500 may also include an electrode support assembly 510. The electrode support assembly may include a number of components to control use and movement of an electrode with the system, which may be the anode in embodiments. Electrode support assembly 510 may include a vertically translatable holder 515. Holder 515 may be configured to couple with electrode 520, which may be similar to anode 140 previously described. Holder 515 may also electrically couple electrode 520 with a power source for operation of the metallurgical system. Certain configurations or operational uses of metallurgical system 500 may consume or damage electrode 520, which may need to be replaced. Accordingly, holder 515 may be sized to accommodate at least a portion of a first electrode and a portion of a second electrode simultaneously, allowing continuous use of the electrode, without requiring system down time for the component transfer. In operation, electrode 520, which may be an anode, may extend within an internal volume of refractory vessel 110 as previously described through gas seal 130 coupled with lid 120. A distal portion of the electrode 520 may then be coupled with the vertically translatable holder 515, which may be coupled with machinery for translating the anode during operation of the metallurgical system 500.

Electrode support assembly 510 and refractory vessel 110 may be standalone components in some embodiments depending on the size of the system, or the volumetric requirements. Additionally, as illustrated, one or both of electrode support assembly 510 and refractory vessel 110 may be incorporated with a system base 525 configured to support and space the components relative to one another for processing. Current collector 125 may reside below refractory vessel 110 as previously discussed, and thus system base 525 may be configured to accommodate current collector 125. As illustrated, system base 525 may include a platform 527 on which the refractory vessel 110 may be supported. Platform 527 may have a frame shape to provide access for the conductive extensions of current collector 125 to extend into refractory vessel 110 and electrically couple with the refractory vessel 110. Current collector 125 may be positioned between the platform 527 and the system base 525. In embodiments the current collector may be coupled with the system base 525 or the platform 527, while in other embodiments, the current collector may not be coupled with either structure, and may be coupled and maintained by refractory vessel 110. Platform 527 may also provide protection over bus bar connections of the current collector 125, where electrical connections may be made.

The electrode support assembly 510 may include multiple components to enable fine tune movement of electrode 520. Because electrode 520 may be centrally located over refractory vessel 110, electrode support assembly 510 may be positioned laterally from refractory vessel 110, while extending at least partially across refractory vessel 110 to couple with electrode 520. Electrode support assembly 510 may include at least one stationary structure and at least one translatable structure that operate in conjunction to control movement of electrode 520. For example, electrode support assembly 510 may include a mast 530, which may be stationary in embodiments. For example, mast 530 may be fixedly coupled with system base 525, or some other structure on which the metallurgical system 500 is provided. Mast 530 may include a track or other features on which trolley 535 may extend. Trolley 535 may be moveably coupled with any of the components of mast 530, such as a track 540 illustrated.

Either the trolley 535 or the mast 530 may include a motorized control for moving trolley 535 vertically on mast 530. For example, trolley 535 may include a motorized control enabling the trolley to move and stop at any number of locations along track 540. Track 540 may also operate to direct trolley 535, while an additional structure, such as guide 545 may allow trolley 535 to move vertically. The guide and/or trolley may include a chain or screw guide allowing trolley 535 to make minute movements along the mast 530. Additionally, mast 530 may include a motorized controller that may turn or otherwise enable guide 545, which may adjust the height of trolley 535 along track 540. It is to be understood that these embodiments are merely examples, and any number of other faculties for providing vertical translation of trolley 535 are similarly encompassed by the present technology.

The electrode support assembly 510 may also include a truss 550 coupled with trolley 535. Truss 550 may include at least one, two, or more arms coupled with trolley 535. As illustrated, truss 550 includes two arms coupled with opposite sides of trolley 535 about mast 530. Truss 550 may couple the vertically translatable holder 515 with the trolley 535. Because of the dimensions of refractory vessel 110, and the location of anode 520, truss 550 may extend laterally in one or more ways from mast 530 to a position in relative line with a central portion of lid 120. For example, as illustrated, truss 550 may be or include a curved design or curved components extending from a first end of truss 550 coupled with trolley 535 to a second end with which the vertically translatable holder 515 is coupled. The second end of truss 550 may curve to a location that positions vertically translatable holder 515 in line with an aperture, such as a central aperture of lid 120. In other examples, truss 550 may include multiple pieces, such as an L-shaped or other multi-piece member including a vertical component as well as a lateral component. For example, truss 550 may position the holder in axial alignment about a vertical axis with an aperture of the lid 120, such as central aperture 132 as previously described.

Although termed a truss throughout the present disclosure, it is to be understood that the term truss for truss 550 is intended to cover or be defined as any supporting member such as a buttress, joist, brace, beam, arm, strut, or any support or structural member or members that may couple with the mast and the anode in embodiments. Although a specific truss is illustrated, it is to be understood that different mechanical supports may be used to the same effect and are similarly encompassed by the present technology.

Metallurgical system 500 may include electrical systems as well. A cathode bus 555 may be positioned on system base 525, which may provide an electrical coupling location from a power source (not shown). Similarly, an anode bus 560 may be positioned on mast 530, which may provide an electrical coupling location from a power source (not shown). The two bus connectors may allow the metallurgical system 500 to be coupled with a power source as a cell allowing either electrode to operate as an anode or cathode of the system depending on the particular connection scheme. A separate power source may be provided to operate or provide motive power to the trolley 535. Accordingly, the electrode support assembly 510 may be coupled with two power sources in embodiments, where a first power source is electrically coupled through the vertically translatable holder or truss to electrode 520, and a second power source is electrically coupled with the trolley.

Figure 6:
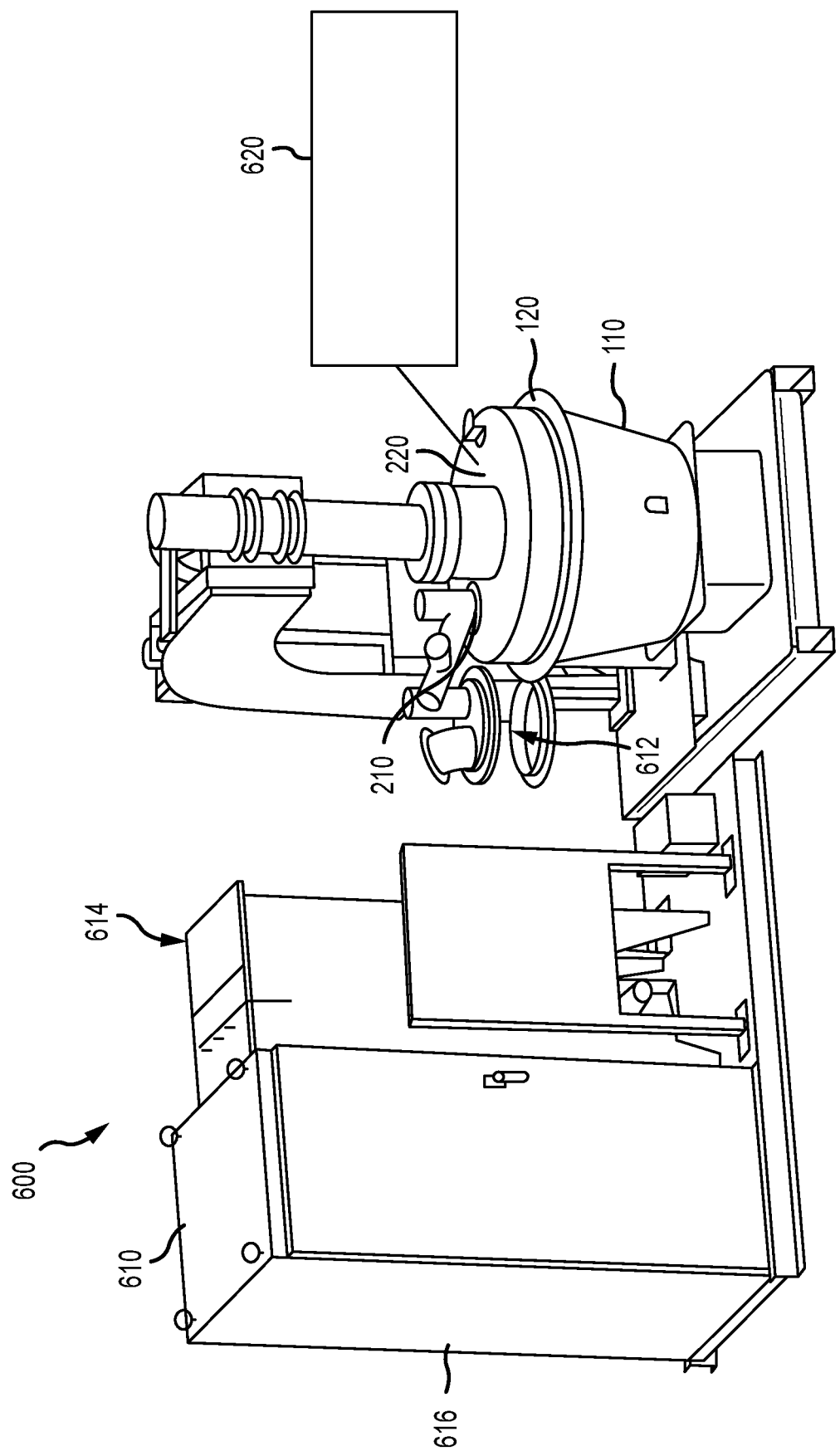
FIG. 6 illustrates a schematic perspective view of an exemplary metallurgical system according to embodiments of the present technology.

FIG. 6 illustrates a schematic perspective view of an exemplary metallurgical system 600 according to embodiments of the present technology. Metallurgical system 600 may include some or all of the components of metallurgical assembly 100 as previously described, and may include some or all of the components of metallurgical system 500 as previously described. For example, metallurgical system 600 may include refractory vessel 110. Metallurgical system 600 may also include a lid 120, which may be configured to form a substantially hermetic seal with refractory vessel 110 as previously described. Lid 120 may also define a plurality of apertures as discussed above with regard to FIG. 2. For example, lid 120 may include at least one exhaust port 210, and may include at least one feed port 220. Metallurgical system 600 may also include an electrode support assembly 510 as previously described.

Metallurgical system 600 may also include associated systems for delivery and removal of materials from the refractory vessel. For example, metallurgical system 600 may include an exhaust system 610 configured to receive or remove materials from the refractory vessel 110. Exhaust system 610 may include piping coupled with lid 120 at exhaust port 210. As previously explained, lid 120 may provide a hermetic seal with refractory vessel 110 to contain produced vapor, such as oxygen-containing materials developed at the anode. These gas species may be removed from refractory vessel 110 through piping coupled with the exhaust port 210. The piping may include one or more valves to allow a controlled removal of gas species from the refractory vessel in embodiments. For example, although in some embodiments effluent vapor may freely flow from refractory vessel 110 through piping coupled with exhaust port 210, in some embodiments access through exhaust port 210 may be controlled to occur at set intervals, such as when an amount of gas species has built up within the refractory vessel. For example sensors may detect a buildup of pressure within the refractory vessel 110, which may engage, automatically or otherwise, release of gas from the vessel into the exhaust system 610.

Exhaust system 610 may include any number of filters, scrubbers, or treatment devices to facilitate collection and/or treatment of gas species from the metallurgical system 600. For example, some operational byproducts may include oxygen, which may be filtered as it exits the refractory vessel 110 and then collected. Exhaust system 610 may include a settling tank 612, configured to allow particulate removal of exhaust species. As an electrolyte frozen crust may form during operation, additional access may be provided to punch through the crust to access gas species contained within. The removal may carry particulate material from the crust, or from internal materials, which may settle in tank 612 as gas species are delivered through exhaust system 610. In other embodiments, the effluent gas species may include gases that may be treated for environmental reasons, or in order to collect a more valuable product. Because the gas species may be exiting the refractory vessel at temperatures in the hundreds or thousands of degrees, the heat may be utilized to cause treatment to occur. For example, a catalytic converter may be included with an air entrainment system that may allow exiting effluent species to convert, such as from carbon monoxide to carbon dioxide. Exhaust system 610 may also include an apparatus for collecting carbon monoxide. Additionally, a burner 614 may be included with a source of air or oxygen to oxidize effluents into alternative species. Exhaust system 610 may also include cabinet 616, which may include controls and fluid delivery systems for use in the exhaust collection and/or treatment.

Metallurgical system 600 may also include a feed system 620 operatively coupled with one or more feed ports 220. Again, feed system 620 may be coupled with lid 120 to maintain a hermetic seal with the system. The feed system may allow delivery of starting material to refractory vessel 110 to produce a target material. For example, oxides of a target metal may be delivered into refractory vessel 110 through feed system 620. The feed system may deliver material continuously, or delivery may be structured around production and removal of target material, such as periodic or batch delivery of materials, which may enable continuous operation of refractory vessel 110 and metallurgical system 600. Feed system 620 may also include a tool to puncture an electrolyte crust prior to delivery of material into the refractory vessel. In embodiments, multiple feed ports may be included in the lid, and additional feed systems may be utilized for delivery of multiple materials, or delivery to different areas of the vessel.

Figure 7:
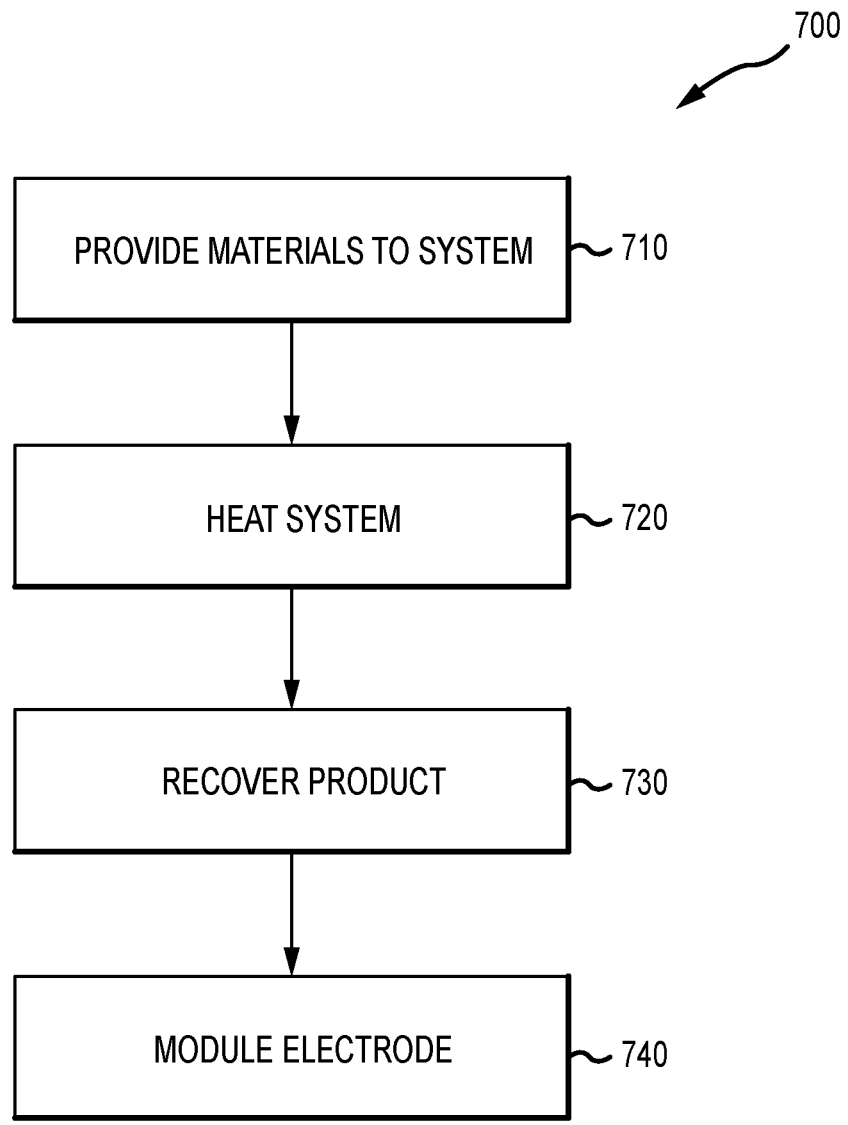
FIG. 7 illustrates selected operations in an exemplary method of utilizing a metallurgical system according to the present technology.

The systems and devices previously described may be utilized in a number of methods of processing materials. FIG. 7 illustrates selected operations in an exemplary method 700 of utilizing a metallurgical system according to the present technology. The methods may utilize any or all of the devices or system previously described in a variety of operations from refining metals to processing and producing alloys and other products from a variety of raw materials.

An initial amount of material may be deposited into refractory vessel 110 at operation 710. The materials may include at least some of a metal or metal-containing material such as an ore, an electrolyte, slag, coke, or other refractory or furnace materials. Depending on the furnace type or operational method, electrode 140 may be either the anode or the cathode in communication with the plurality of conductive elements, and may be either polarity in operation. For example, in molten oxide electrolysis, electrode 140 may be the anode, and a current may be delivered through the anode into the materials housed within the vessel and through conductive extensions 425 to the collector 125. The delivered current may produce Joule heating within the refractory vessel at operation 720, which may begin processing of the materials. A high current, which may be in the hundreds, thousands, or hundreds of thousands of amperes may be delivered through the system to generate heat. For example, the current may be between about 1,000 and about 5,000 amperes, or may be between about 5,000 and about 10,000 amperes in embodiments. The current may be any individual amount within these ranges, such as for example 4,000 amperes, or may be above or below any of the stated numbers. The generated heat may develop vessel temperatures sufficient to melt the materials within the vessel.

As the materials melt, a reduction-oxidation process may occur to separate the materials. For example, if oxides of metals are included within the materials to be refined, such as for example iron oxide, aluminum oxide, etc., oxygen-contianing ions may flow towards anode 140 and be oxidized, while metal ions flow towards the current collector 125 and are reduced. The metal that may form at the refractory base 114 within interior region 115 may be molten, negatively charged metal, and thereby act as the cathode of the process, while receiving electrons from the conductive extensions of current collector 125. This negatively charged, molten metal may be refined by the process and extracted or recovered from the vessel through one or more ports 502 at operation 730. The oxygen ions may form oxygen gas at the anode 140, and bubbles of oxygen gas, carbon dioxide, carbon monoxide, or other gas species may develop and be released from the vessel. While the molten metal produced is recovered from the system at operation 730, the volume of material within the refractory vessel 110 may be reduced. If the components of the system are not adjusted, anode 140 may lose contact with the electrolyte materials. Accordingly, during operation as well as or during extraction, anode 140 may be modulated vertically to maintain contact with materials within refractory vessel 110 at operation 740. Similarly, as additional material is delivered into refractory vessel 110, the material level may rise within the vessel, and anode 140 may be raised.

The electrolyte materials used in the processing operations may be selected based on the materials being produced. In embodiments, a family of electrolytes used for metal oxide electrolysis production of relatively more reactive metals may include metal oxides, as well as mixtures of oxide species. Exemplary metal oxides may include BeO, CaO, MgO, SrO, and BaO. Additionally, oxides of Al, Si, Sc, Y, La, Ce, Pr, Nd, Pm, Sm, Eu, Gd, Tb, Dy, Ho, Er, Tm, or Yb may be included with any of the other oxide species. The present system may also be utilized with radioactive metals and any other materials that may facilitate processing according to the present technology. The proportions of the oxides included in the electrolyte mixtures may be chosen to match the necessary physical and chemical properties for extraction of the target metal by molten oxide electrolysis. The physical properties may include that the electrolyte is less dense than the target metal or target alloy, when the target metal is reduced into a host alloy. In some embodiments, the density difference may be at least about 0.2 g/cm$^3$, although in some embodiments the density difference may be more or less, although larger values may facilitate separation. Additionally, electrolyte materials may be characterized by a increased density over target materials, which may occur in alloy processing, for example.

Operation of systems according to the present technology may occur over a range of values, which may be in part based on the materials being processed. For example, anode and cathode current densities may include averages over a range of values. Cathode current densities may range from less than or about 0.3 A/cm$^2$ to about 10 A/cm$^2$ or more. Anode current densities may be in ranges based in part on the anode material used. For example, inert anodes may operate at within a reduced range of current densities as compared to graphite or other anode materials. According to the present technology, inert anode materials may operate at current densities from less than or about 2 A/cm$^2$ to about 10 A/cm$^2$ or more. Additionally, graphite anode materials may operate at current densities from less than or about 0.5 A/cm$^2$ to about 40 A/cm$^2$ or more. Voltage differences between anode and cathode materials may similarly vary based on the material used for the anode, with inert materials forming a narrower operational window. For example, in combinations utilizing an inert anode material, voltage differences between anode and cathode may range between about 1 V up to about 110 V or more. Additionally, in combinations utilizing a graphite or other anode material, voltage differences between anode and cathode may range between about 1 V up to about 130 V or more.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A metallurgical assembly comprising:
a refractory vessel including sides and a base, wherein the base defines a plurality of apertures centrally located within the base, wherein the sides and the base at least partially define an interior volume of the refractory vessel, wherein the refractory vessel comprises at least two layers of material, wherein an exterior layer comprises an insulating material, and wherein an interior layer comprises a material configured to be compatible with an electrolyte contained within the interior volume of the refractory vessel;
a lid removably coupled with the refractory vessel and configured to form a seal with the refractory vessel, wherein the lid defines a plurality of apertures through the lid; and
a current collector proximate the base of the refractory vessel, wherein the current collector includes conductive extensions positioned within the plurality of apertures centrally located within the base.

2. The metallurgical assembly of claim 1, further comprising a gas seal coupled about a first aperture of the plurality of apertures defined through the lid, wherein the gas seal is configured to receive and pass a movable anode through the gas seal and first aperture defined through the lid.

3. The metallurgical assembly of claim 2, wherein the gas seal is configured to limit gas release from the refractory vessel through the first aperture of the plurality of apertures defined through the lid.

4. The metallurgical assembly of claim 1, wherein the plurality of apertures defined through the lid comprise an exhaust aperture sized to distribute gas from the refractory vessel, and a feed aperture sized to distribute material into the refractory vessel.

5. The metallurgical assembly of claim 1, wherein the refractory vessel comprises a powder layer at least partially defining sidewalls of the refractory vessel, and a compatibility layer defining the base of the refractory vessel, and wherein the compatibility layer also at least partially defines the sidewalls of the refractory vessel.

6. The metallurgical assembly of claim 1, wherein the refractory vessel further comprises an intermediate layer of material positioned to define at least a portion of the interior volume of the refractory vessel.

7. The metallurgical assembly of claim 1, wherein the interior layer is characterized by a thermal conductivity below or about 25 W/(m·K).

8. The metallurgical assembly of claim 1, wherein the insulating material is characterized by a thermal conductivity below or about 5 W/(m·K).

9. A metallurgical system comprising:
a refractory vessel; and
an electrode support assembly, wherein the electrode support assembly comprises:
  a vertically translatable holder, wherein the vertically translatable holder is configured to couple with an electrode and electrically couple the electrode with a power source;
  a mast, wherein the mast comprises a vertical track,
  a trolley moveably coupled with the vertical track, and
  a truss coupling the vertically translatable holder with the trolley.

10. The metallurgical system of claim 9, further comprising a system base including a platform on which the refractory vessel is supported.

11. The metallurgical system of claim 10, further comprising a current collector positioned between the platform and the system base, wherein the current collector is mechanically coupled with the refractory vessel.

12. The metallurgical system of claim 9, wherein the truss comprises a curved truss extending from a first end at the trolley to a second end at which the vertically translatable holder is coupled.

13. The metallurgical system of claim 12, wherein the second end of the curved truss positions the vertically translatable holder in axial alignment about a vertical axis with an aperture of a lid removably coupled with the refractory vessel and configured to form a seal with the refractory vessel, wherein the lid defines a plurality of apertures through the lid.

14. The metallurgical system of claim 9, further comprising a first power source electrically coupled with the electrode by the vertically translatable holder, and a second power source electrically coupled with the trolley.

15. The metallurgical system of claim 9, wherein the electrode is an anode, wherein a first end of the anode extends within an internal volume defined by the refractory vessel, and wherein a distal portion of the anode is coupled with the vertically translatable holder.

16. A metallurgical system comprising:
a refractory vessel having a base, wherein the base defines a plurality of apertures centrally located within the base, wherein the refractory vessel comprises at least two layers of material, wherein an exterior layer comprises an insulating material, and wherein an interior layer comprises a material configured to be compatible with an electrolyte contained within an interior volume of the refractory vessel;
a current collector proximate the base of the refractory vessel, wherein the current collector includes conductive extensions positioned within the plurality of apertures centrally located within the base;
a lid removably coupled with the refractory vessel and configured to form a seal with the refractory vessel, wherein the lid defines a plurality of apertures through the lid, and wherein a first aperture of the plurality of apertures comprises an exhaust port;
an electrode support assembly; and
an exhaust system coupled with the exhaust port of the lid, wherein the exhaust system is configured to oxidize effluents received from the refractory vessel.

17. The metallurgical system of claim 16, wherein a second aperture of the plurality of apertures defined through the lid comprises a feed port, and wherein the metallurgical system further comprises a feed system coupled with the feed port, and configured to provide material into the refractory vessel.

18. The metallurgical system of claim 16, further comprising a gas seal coupled about an additional aperture of the plurality of apertures defined through the lid, wherein the gas seal is sized to receive and pass a movable anode through the gas seal and the additional aperture defined through the lid.

19. The metallurgical system of claim 16, wherein the refractory vessel further comprises a powder layer, wherein the refractory vessel further comprises a compatibility layer defining the base of the refractory vessel, and wherein the compatibility layer also at least partially defines sidewalls of the refractory vessel.

* * * * *